(12) United States Patent
Katsaros et al.

(10) Patent No.: US 10,968,951 B2
(45) Date of Patent: Apr. 6, 2021

(54) ROLLER BEARING

(71) Applicant: AKTIEBOLAGET SKF, Gothenburg (SE)

(72) Inventors: Padelis Katsaros, Schweinfurt (DE); Volker Wendt, Üchtelhausen/Zell (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 16/699,952

(22) Filed: Dec. 2, 2019

(65) Prior Publication Data

US 2020/0182301 A1    Jun. 11, 2020

(30) Foreign Application Priority Data

Dec. 10, 2018   (DE) .......................... 102018221310.0

(51) Int. Cl.
| | |
|---|---|
| *F16C 33/46* | (2006.01) |
| *F16C 19/36* | (2006.01) |
| *F16C 25/08* | (2006.01) |
| *F16C 33/56* | (2006.01) |

(52) U.S. Cl.
CPC ........ *F16C 33/4605* (2013.01); *F16C 19/364* (2013.01); *F16C 25/08* (2013.01); *F16C 33/4617* (2013.01); *F16C 33/56* (2013.01)

(58) Field of Classification Search
CPC .......... F16C 25/00; F16C 25/06; F16C 25/08; F16C 33/4605; F16C 33/506; F16C 33/467; F16C 33/4682; F16C 33/3887; F16C 43/065; F16C 33/605; F16C 19/364; F16C 19/383; F16C 19/385; F16C 19/386; F16C 33/4617; F16C 33/4623; F16C 33/4652; F16C 33/56
See application file for complete search history.

(56) References Cited

U.S. PATENT DOCUMENTS

| | | | | |
|---|---|---|---|---|
| 3,915,522 | A * | 10/1975 | Halbig | F16C 19/364 384/571 |
| 4,319,789 | A * | 3/1982 | Irwin | F16C 19/225 384/450 |
| 4,614,446 | A * | 9/1986 | Dreschmann | F16C 21/005 384/484 |
| 4,660,997 | A * | 4/1987 | Brandenstein | F16C 33/605 384/484 |
| 4,723,645 | A * | 2/1988 | Rabe | F16D 41/067 192/45.012 |
| 8,783,966 | B2 * | 7/2014 | Schlegel | F16C 19/364 384/572 |
| 9,709,098 | B2 * | 7/2017 | Kent | F16C 33/467 |
| 10,066,663 | B2 * | 9/2018 | Wilm | F16C 33/7889 |
| 2004/0131296 | A1 * | 7/2004 | Friedrich | F16C 33/7853 384/561 |
| 2008/0008411 | A1 * | 1/2008 | Hayashi | F16C 33/605 384/463 |
| 2017/0211625 | A1 * | 7/2017 | Katsaros | F16C 19/386 |

* cited by examiner

*Primary Examiner* — Alan B Waits
(74) *Attorney, Agent, or Firm* — J-TEK Law PLLC; Scott T. Wakeman; Mark A. Ussai

(57) ABSTRACT

A roller bearing includes an inner ring and an outer ring and a cage between the inner ring and the outer ring in which a plurality of rollers are retained. The inner ring or the outer ring includes a guide flange for guiding the rollers, and a biasing member exerts a biasing force, directed toward the guide flange, on the rollers and/or on the cage.

20 Claims, 5 Drawing Sheets

ROLLER BEARING

CROSS-REFERENCE

This application claims priority to German patent application no. 10 2018 221 310.0 filed on Dec. 10, 2018, the contents of which are fully incorporated herein by reference.

TECHNOLOGICAL FIELD

The present disclosure is directed to a roller bearing, in particular a tapered roller bearing, that has an inner ring and an outer ring and rollers disposed therebetween which rollers are held by a cage. The inner ring or the outer ring includes a guide flange for guiding the rollers.

BACKGROUND

In order to ensure a good running performance of roller bearings, for example, in wheel bearing units, it is important to ensure a secure position of the rollers with their end side on the guide flange or guide shelf. However, in the operation of the bearing it can happen that a roller loses contact between the roller end-side and the guide flange. This can lead to a misalignment of the rollers and thus to a jamming of the bearing as well as subsequent damage to the bearing. In order to ensure a correct positioning of the rollers it is possible to reduce the clearance in the cage of a roller bearing. For this purpose the pocket size of the cage can be adapted such that it corresponds to the actual roller shape. However, this has the disadvantage that tolerances in the manufacturing of the rollers or of the cage cannot be compensated for. Instead it is necessary to manufacture the rollers and the cage very precisely, which in turn leads to increased costs.

SUMMARY

It is therefore an aspect of the present disclosure to provide a roller bearing using which a secure guiding of the rollers can be ensured in a cost-effective manner.

Instead of adapting, as with roller bearings up to now, the size of the cage pockets to the actual roller size, in the roller bearing disclosed here it is provided to use a biasing element. For this purpose this biasing element is configured to exert a biasing force directed toward the guide flange. Here the biasing element can exert the biasing force either directly on the rollers or indirectly via the cage onto the rollers. In this way it is ensured that the rollers are biased permanently toward the guide flange, for example, inside the cage pocket. In this way the end surfaces of the rollers run essentially flat against the guide flange, in particular in operation. Manufacturing tolerances of the rollers or of the cage can be compensated for in this way. Furthermore, damage to the roller bearing due to misalignments of the rollers can thus be avoided.

According to one embodiment the cage includes two side rings, between which bridges extend axially. Pockets for receiving the rollers are formed by the side rings and bridges, wherein the biasing element is formed as an elastic spring element that is disposed on one of the side rings and extends into at least one of the pockets of the cage. A plurality of spring elements are preferably provided that can be uniformly distributed circumferentially. It can be ensured by the uniform distribution that unequal pressure is not exerted onto the rollers and/or the cage, which unequal pressure could lead to a tilting or misalignment.

The cage can be manufactured, for example, from plastic. This has the advantage that the cage is light and simultaneously robust. For example, the cage can be manufactured by an injection-molding method or a similar method. In this case the spring elements are preferably formed one-piece with the cage, which makes possible a particularly simple manufacturing. Alternatively the spring elements can also be formed multi-piece with the cage.

The rollers can be contacted by the elastic spring element in particular in the center of their narrow side. The force that acts on the rollers can thus act essentially centrally on them, whereby the opposite end surface is pressed essentially flat against the larger axial pocket surface, i.e., toward the guide flange. Due to the biasing of the roller against the larger axial pocket surface, i.e., toward the guide flange, the roller set is positioned in its optimum position via the cage. The rollers that are located in a secure flange system define the position of the cage, and this in turn defines the position in the vicinity of the flange of the remaining tapered rollers. Since the remaining rollers are also brought into their position by the cage, it is possible to provide only one elastic spring element and to ensure the positioning of the remaining rollers by the cage. However, in one preferred embodiment such an elastic spring element or at least two opposing spring elements and/or spring elements uniformly distributed circumferentially are provided, since a uniform pressure is thus exerted onto the rollers and/or the cage and a tilting is prevented via the cage diameter.

According to a further embodiment the biasing element can be an intermediate ring that is attached to the inner ring or the outer ring. In particular the intermediate ring can include an axially extending section that can be attached to the inner ring or the outer ring, for example, by press-fit.

If the intermediate ring is attached to the outer ring, the intermediate ring can be comprised only of the axially extending section wherein one end of this section can be brought into contact with the rollers. In this way the biasing force is exerted on the rollers by the axial section of the intermediate ring.

Furthermore, the intermediate ring can include a radially extending section that abuts against the cage and/or against the rollers. Due to the radially extending section a biasing force can be exerted on the cage and thus indirectly on the rollers or directly on the rollers. If the radially extending section of the intermediate ring acts on the cage, it can prevent an axial movement of the cage and thus also an axial movement of the rollers. This also contributes to a securing of the positioning of the rollers on the guide flange. In each case the rollers and the cage are pushed in their entirety against the guide flange by the radially extending section of the intermediate ring. The radially extending section of the intermediate ring can include a spring lip in order to contact the rollers and/or the cage. In this way the rollers and/or the cage are contacted by an elastic element, whereby manufacturing tolerances in particular of the rollers can be compensated for.

According to one embodiment the intermediate ring can be combined with the elastic spring elements that are provided on the cage. In this case the intermediate ring is preferably disposed such that the radially extending section acts on the cage in order to secure it axially. Furthermore the effect of the elastic spring elements can be strengthened and improved by the radially extending section of the intermediate ring via the cage.

The intermediate ring can be manufactured in particular from plastic. This offers the advantage that the intermediate ring is on the one hand very light and on the other hand is also easy to manufacture. In order to ensure that the radially extending section of the intermediate ring is not deformed by force in operation, stiffening ribs can be provided on the intermediate ring. Here the stiffening ribs are disposed on the axially extending section and abutting against the radially extending section. The stiffening ribs support in particular the radially extending section.

In a not-completely-assembled state of the roller bearing the intermediate ring can project beyond the inner ring or the outer ring in the axial direction. When the roller bearing is assembled, in particular in use in a wheel bearing unit with a second roller bearing, the intermediate ring is displaced during the assembly such that it terminates axially flat with the inner ring or the outer ring. Here the section of the intermediate ring that projects in the axial direction in the not-completely-assembled state is to be dimensioned in particular such that a pre-set biasing force is exerted on the cage or the rollers by the displacing of the intermediate ring around this section. In this way a simple calibration of the biasing force is possible via the intermediate ring during the assembly.

According to a further embodiment the intermediate ring is formed as a spring ring. Such a spring ring can be manufactured, for example, from spring steel. This offers the advantage that the spring ring is very stable and simultaneously elastic. The elasticity of the spring ring can be improved even further by the spring ring having elastic tongues that abut against at least one of the rollers. Starting from the spring ring the elastic tongues are preferably projecting in the radial direction and exert the biasing force on the rollers. The elastic tongues can be uniformly distributed in particular circumferentially. This has the advantage that an elastic tongue can act on each roller. Alternatively the elastic tongues can also be disposed such that the biasing force is exerted only on some of the rollers, for example, every second roller. When the intermediate ring is pushed-on, the biasing force on the rollers by the elastic tongues can be reduced or even removed. It can thus be ensured that the rollers are loaded by the high biasing force toward the guide flange only in the final assembly step of the bearing, as is desirable for transport.

In general due to the biasing element it is possible to ensure that the rollers remain in contact with the guide flange and in in particular run with their end sides essentially flat on the guide flange. Manufacturing tolerances in the roller size can be compensated for here by the biasing element. In particular a not-absolutely-precise manufacturing of the rollers or of the cage is possible without impairing the function of the roller bearing.

A biasing element projecting axially beyond the inner ring can be configured such that in its first position it presses the rollers against the guide flange, but at the moment of bearing clamping it slips further onto the inner ring and comes into contact there, for example, with the retaining flange. Here the biasing elements lift out outward in the radial direction and in turn remove themselves from the small end sides of the tapered rollers. Thus both a secure positioning of the rollers on the guide flange from leaving the manufacturing of the bearing up to the moment of bearing assembly, and a contact-free running of the rollers in operation can be made possible.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
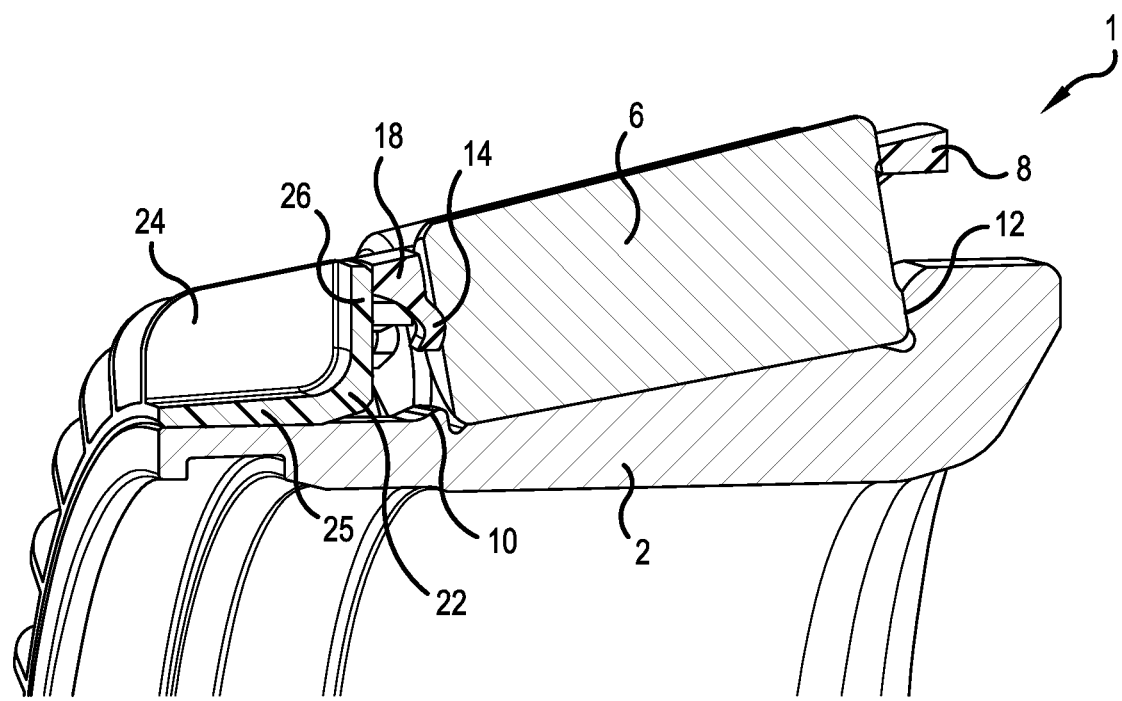
FIG. 1 is a sectional perspective view of an embodiment of a roller bearing including an intermediate ring and a spring element.

FIG. 1 shows a perspective view of a roller bearing 1. In all Figures the roller bearing 1 is depicted as a tapered roller bearing including tapered rollers 6. Other types of roller bearings 1 such as, for example, cylindrical roller bearings are also possible.

Figure 2:
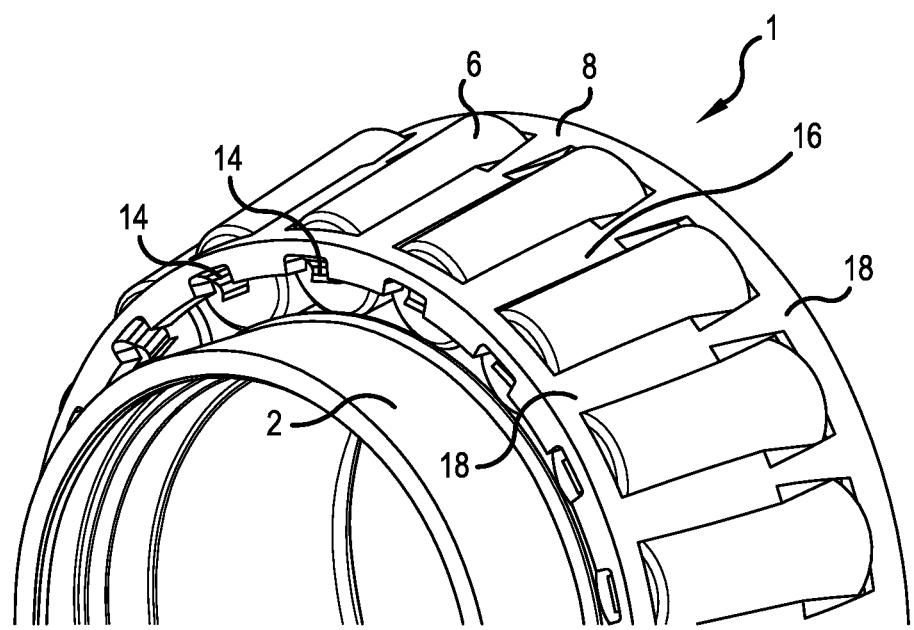
FIG. 2 is a perspective view of a further embodiment of a roller bearing including a spring element according to the present disclosure.
Figure 3:
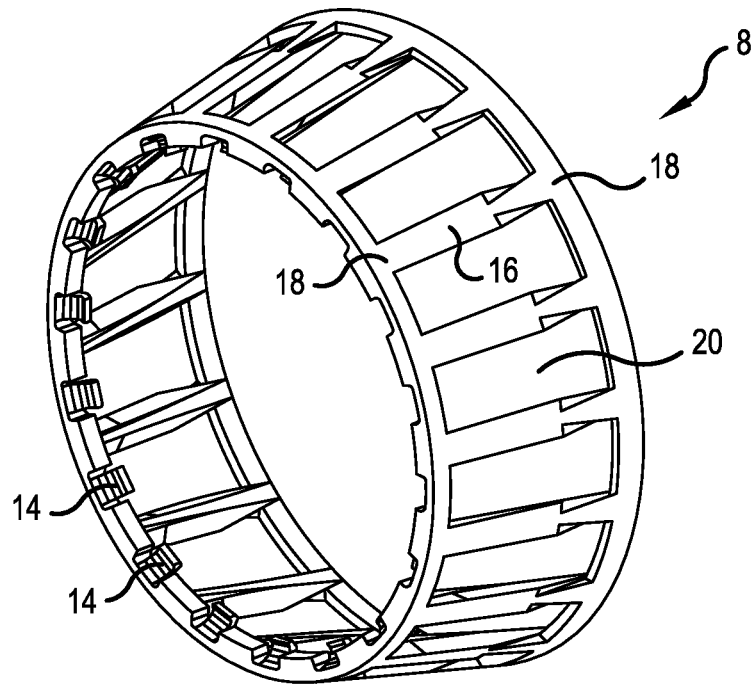
FIG. 3 is a perspective view of the cage of the roller bearing of FIG. 2.

The roller bearing 1 includes an inner ring 2 and an outer ring 4 (only in FIG. 7), and rollers 6 disposed therebetween. The rollers 6 are held in their position by a cage 8, and the cage 8 is disposed between the inner ring 2 and the outer ring 4. As depicted in FIGS. 2 and 3, the cage 8 includes axially extending bridges 16, and side rings 18 that are connected by the bridges 16. Pockets 20 for receiving the rollers 6 are formed between the side rings 18 and the bridges 16. The cage 8 can be, for example, a plastic cage. This has the advantage that such a cage 8 is light, robust, and easy to manufacture.

The inner ring 2 includes a retaining flange 10 and a guide flange 12, wherein the rollers 6 are positioned between the two flanges 10, 12. With rotation of the roller bearing 1 the rollers 6 should run flat against the guide flange 12. In this way a misalignment of the rollers 6 and thus a partial sliding instead of pure rolling of the rollers 6 in the cage 8, and thus an overheating and damage to the bearing 1 resulting therefrom, can be avoided. However, due to manufacturing tolerances on the rollers 6, in operation they do not always reliably run against the guide flange 12 in the desired manner, since due to unloaded states of the rollers 6 they can move between the retaining flange 10 and the guide flange 12.

In order to now ensure that in particular also in operation the rollers 6 run essentially flat against the guide flange 12 and are guided by it, the roller bearing 1 includes a biasing element that exerts a biasing force directed toward the guide flange 12 on the cage 8 or the rollers 6. Due to this biasing force it can be ensured that the rollers 6 remain in contact with the guide flange 12 as an entire roller set and run with their end sides essentially flat against the guide flange 12.

A first embodiment of such a biasing element is depicted in FIGS. 1, 2 and 3, wherein the biasing element includes one or more elastic spring elements 14. The elastic spring element 14 is provided on the side ring 18 of the cage 8, which side ring 18 opposes the guide flange 12, and extends into the pocket 20. The spring element 14 here abuts against the small end side of the roller 6 and presses it toward the large cage-pocket end. Simultaneously the rollers 6 are securely positioned on the guide flange 12 in the load zone of the tapered roller bearing 1. This in turn defines the position of the cage 8, which for its part also holds the rollers 6 against the guide flange 12 in the unloaded zone of the bearing 1 via the spring elements 14.

In the embodiment depicted in FIG. 1 the biasing element additionally includes an intermediate ring 22. The intermediate ring 22 includes an axially extending section 25 and a radially extending section 26. The axially extending section 25 abuts against the inner ring 2 and is pushed onto it and attached, for example, by press-fit. The radially extending section 26 abuts against the cage 8 and exerts an additional force on the cage 8, which force is directed toward the guide flange 12. An axial displacement of the cage 8 can thus be prevented on the one hand by the intermediate ring 22. On the other hand, due to the intermediate ring 22 the rollers 6 can be pressed toward the guide flange 12 via the cage 8, and a flat running of the rollers 6 against the guide flange 12 is ensured.

The intermediate ring 22 can be manufactured, for example, from plastic. In order to prevent the radial section 26 from bending due to force, the intermediate ring 22 can include stiffening ribs 24. Here the stiffening ribs 24 are disposed on the axially extending section 25 and extend toward the radially extending section 26 in order to support it.

As depicted in FIGS. 2 and 3, the biasing element can also be realized only by the elastic spring elements 14. The elastic spring elements 14 can be manufactured one-piece with the cage 8, in the case of a plastic cage, for example, by an injection-molding method.

The cage 8 includes at least one spring element 14. In order to exert a uniform pressure onto the rollers 6, however, it is preferred that, as depicted, a spring element 14 is provided in each pocket 20. In this way each roller 6 can lie positioned oriented in its pocket 20 and be held against the guide flange 12. If fewer spring elements 14 are used they are preferably uniformly distributed circumferentially in order to make possible a uniform pressure distribution.

Figure 4:
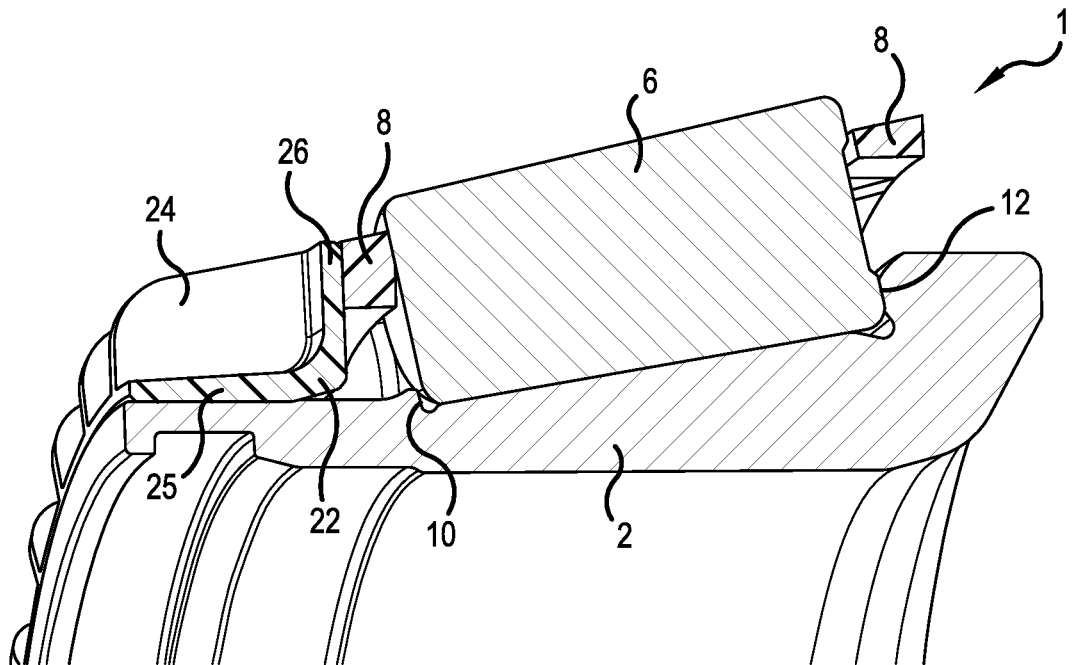
FIG. 4 is a sectional perspective view of a further embodiment of a roller bearing including an intermediate ring according to the present disclosure.
Figure 5:
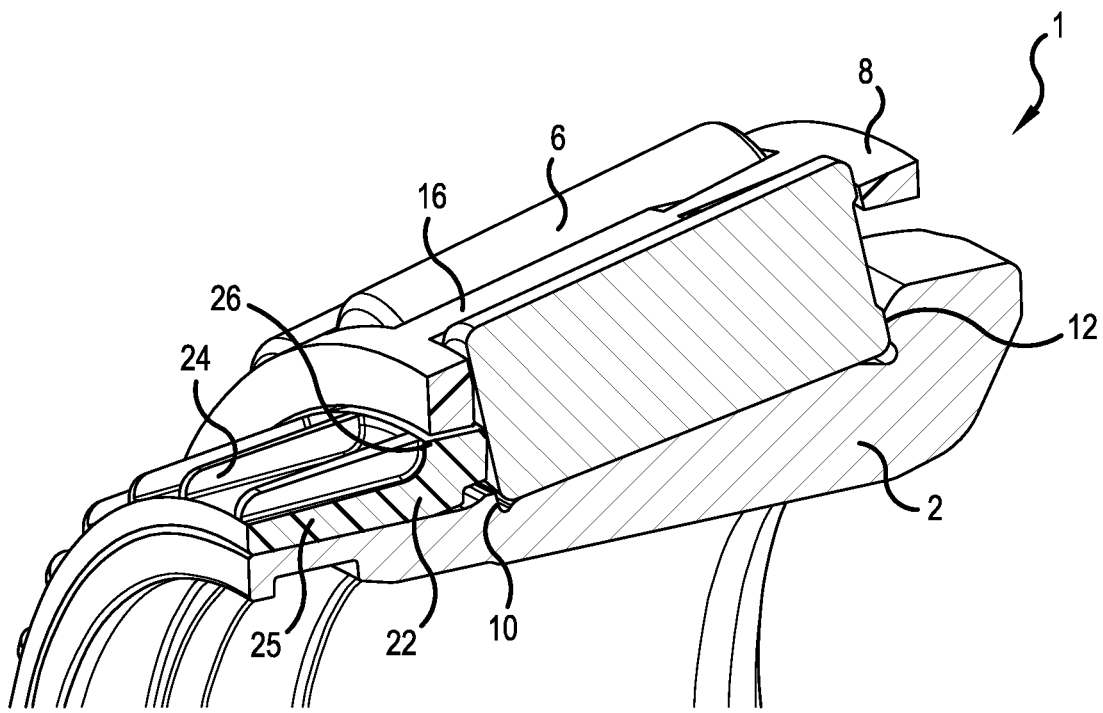
FIG. 5 is a sectional perspective view of a further embodiment of a roller bearing including an intermediate ring according to the present disclosure.

In a further embodiment the biasing element can also be formed only by the intermediate ring 22 as depicted in FIGS. 4 and 5. As is already explained in connection with FIG. 1, the intermediate ring 22 includes a radially extending section 26 that abuts against the cage 8. In this embodiment the positioning of the rollers 6 is ensured exclusively by the intermediate ring 22. This acts on the cage 8 and presses it toward the rollers 6 and the guide flange 12. Thus the rollers 6 are also pressed toward the guide flange 12 in order to run with their large end sides flatly against it. Due to the intermediate ring 22, or more specifically due to the radially extending section 26 of the intermediate ring 22, on the one hand the cage 8 is thus secured against an axial displacement, and on the other hand the smallest possible biasing force directed toward the guide flange 12 is exerted on the cage 8 and thus also on the rollers 6.

In a further embodiment that is depicted in FIG. 5, the radially extending section 26 is disposed such that it exerts a clearance reduction, toward the guide flange 12, optionally also a low biasing force directed toward the flange 12, directly on the rollers 6. Here the intermediate ring 22 or the radially extending section 26 is disposed radially between the inner ring 2 and the outer ring 4. Due to the design of the intermediate ring 22 including a radially extending section 26, the intermediate ring 22 is not in contact with the retaining flange 10, but rather the radially extending section 26 is bent past the retaining flange 10 and contacts the rollers 6 directly on their small end side.

Figure 6:
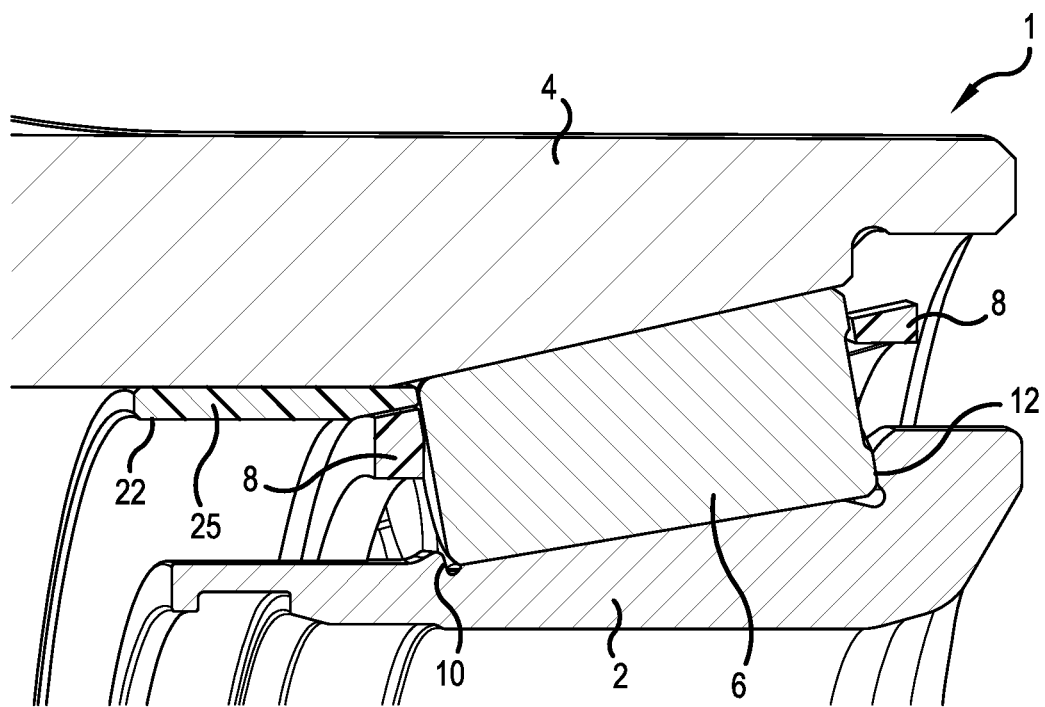
FIG. 6 is a sectional perspective view of a further embodiment of a roller bearing including an intermediate ring according to the present disclosure.

If the intermediate ring 22 is attached to the outer ring 4 as shown in the exemplary embodiment of FIG. 6, the radially extending section 26 can be omitted. Since the outer ring 4 includes no retaining flange 10, the axially extending section 25 of the intermediate ring 22 can extend directly up to the rollers 6. In cases wherein the outer ring 4 includes the retaining flange 10, the intermediate ring 22 attached to the outer ring 4 can also have a radially extending section 26, while the intermediate ring 22 attached to the inner ring 2 includes no radially extending section 26.

In the embodiment depicted the intermediate ring 22 imparts, through the axially extending section 25, either an approximately clearance-free orientation on the rollers 6 or the smallest possible biasing force on the rollers 6 directed toward the guide flange 12. In this embodiment the intermediate ring 22 is furthermore disposed such that it is provided adjacent to the cage 8 and directly exerts a biasing force on the rollers 6 toward the guide flange 12.

Figure 7:
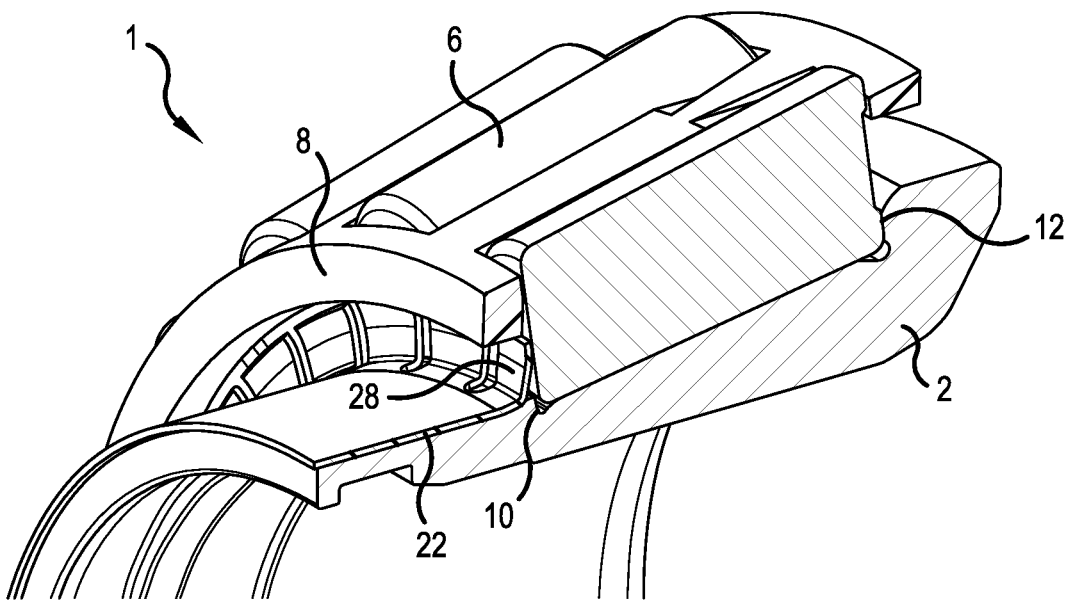
FIG. 7 is a sectional perspective view of a further embodiment of a roller bearing including an intermediate ring according to the present disclosure.
Figure 8:
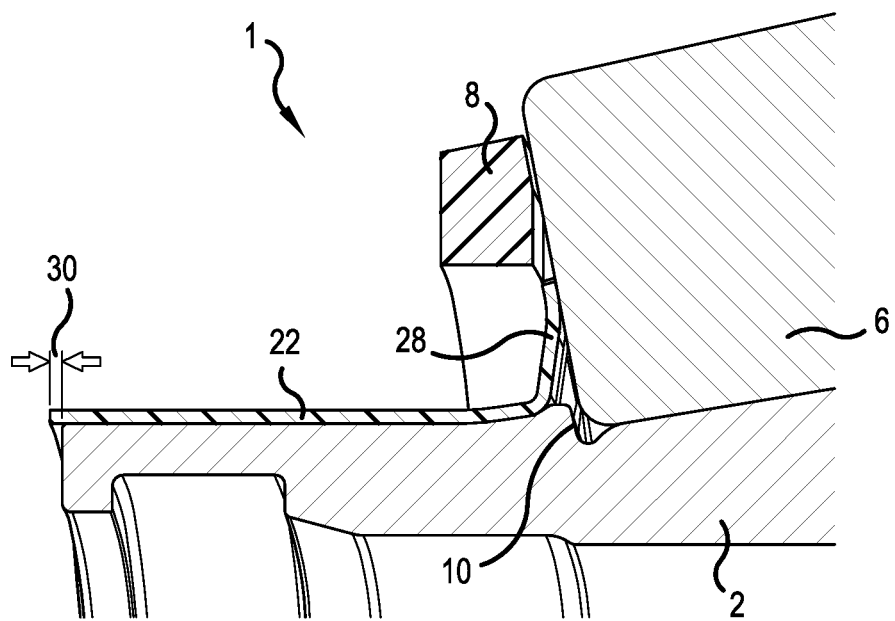
FIG. 8 is a sectional perspective view of the roller bearing of FIG. 7 with the intermediate ring is located in a first position.
Figure 9:
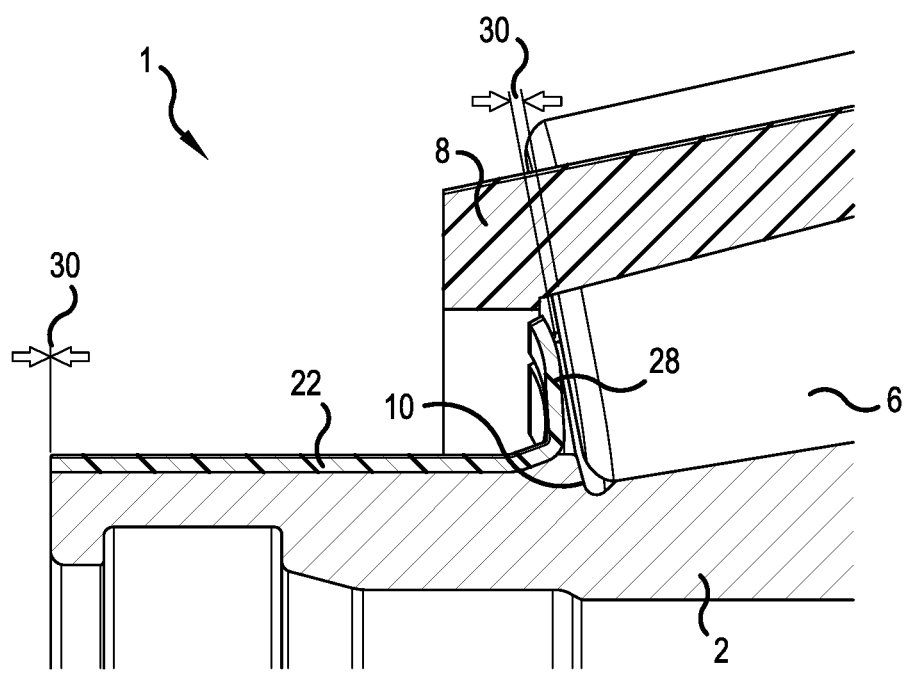
FIG. 9 is a sectional perspective view of the roller bearing of FIG. 7 with the intermediate ring is located in a second, final position.

In a further embodiment that is shown in FIGS. 7 to 9, the intermediate ring 22 can be configured as a spring ring that includes elastic radially projecting tongues 28. In this embodiment the intermediate ring 22 can be manufactured in particular from steel, for example, spring steel, that offers a particularly good stability with simultaneous elasticity. In this embodiment the biasing force acting toward the guide flange 12 is exerted directly on the rollers 6 by the elastic tongues 28. As shown here, the elastic tongues 28 are uniformly distributed circumferentially. For example, the elastic tongues can be disposed such that an elastic tongue 28 always acts on a roller 6. Alternatively a tongue 28 can also act only on some of the rollers 6. Preferably, however, at least two opposing tongues 28 are provided in order to prevent an unequal pressure on the rollers 6 and thus on the cage 8. The advantageous flange system of the rollers 6 can thereby also be ensured in the non-assembled bearing 1.

With the installing of the intermediate ring 22 it can initially project beyond the inner ring 2 or the outer ring 4 in the axial direction, as depicted in FIG. 8. In this position the intermediate ring 22 initially exerts a certain biasing force on the rollers 6. When the roller bearing 1 subsequently fully installed, in particular in a wheel bearing unit that is comprised of two mutually abutting bearings 1, the intermediate ring 22 is displaced in the axial direction such that it terminates flatly with the inner ring 2 or the outer ring 4. This embodiment is suitable in particular for wheel bearing units wherein two roller bearings 1 are disposed adjacent to each other, whereby the respective intermediate rings 22 can be pushed into their final position by the positioning of the two bearings 1.

Due to the displacing of the intermediate ring 22 during the final assembly a biasing force on the rollers 6 is reduced or completely eliminated. Since the tongues 28 are lifted radially from the retaining flange 10 by the displacement 30 of the intermediate ring 22 they tilt away from the rollers as depicted in FIG. 9. It is thus ensured that the rollers 6 are relieved from the high shipping biasing force against the guide flange only in the absolute last assembly step of the bearing 1.

Due to the roller bearing disclosed here it is possible in a simple manner to exert a biasing force on the rollers in order to hold them in contact with the guide flange, in particular even in the loose delivery state of the roller bearing. For this purpose a biasing element can also be used that is formed either as part of the cage, or as a separate intermediate ring, or as a combination thereof. Due to the ensuring of the correct positioning of the rollers on the guide flange a misalignment of the rollers in operation and an escape of the rollers from the guide flange during delivery to the customer can be prevented, whereby damage to the bearing can be avoided.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved roller bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Roller bearing
2 Inner ring
4 Outer ring
6 Rollers
8 Cage
10 Retaining flange
12 Guide flange
14 Elastic spring element
16 Bridge
18 Side ring
20 Pocket
22 Intermediate ring
24 Stiffening rib
25 Axially extending section
26 Radially extending section
28 Elastic tongue
30 Displacement

What is claimed is:

1. A roller bearing having a first axial end and a second axial end, the roller bearing comprising:
    an inner ring having a raceway;
    an outer ring having a raceway;
    a cage between the inner ring and the outer ring, the cage not touching the inner ring and not touching the outer ring; and
    a plurality of rollers retained by the cage and in contact with the inner ring raceway and the outer ring raceway,
    wherein the cage has a first side ring between the first axial end of the roller bearing and the plurality of rollers and a second side ring between the second axial end of the roller bearing and the plurality of rollers and a plurality of bridges connecting the first side ring to the second side ring and defining a plurality of pockets in which the plurality of rollers are received,
    wherein the inner ring includes an inner ring guide flange between the plurality of rollers and the second axial end of the roller bearing or the outer ring includes an outer ring guide flange between the plurality of rollers and the second axial end of the roller bearing, and
    wherein the first side ring includes biasing means for exerting a biasing force against end surfaces of the plurality of rollers toward the second axial end of the roller bearing.

2. The roller bearing according to claim 1, wherein the biasing means comprises a plurality of spring elements distributed circumferentially around the bearing cage in a uniform manner.

3. The roller bearing according to claim 2, wherein the cage is manufactured from plastic, and wherein the plurality of spring elements are formed as one-piece with the cage.

4. The roller bearing according to claim 1, wherein the biasing means comprises a plurality of spring elements, a respective spring element of the plurality of spring elements being located in each of the plurality of pockets.

5. The rolling bearing according to claim 1, wherein the roller bearing is a tapered roller bearing, and wherein the rollers are tapered rollers.

6. The roller bearing according to claim 1,
    wherein the biasing means extends radially inwardly from the first side ring and projects toward the second axial end of the bearing.

7. The roller bearing according to claim 1,
    wherein the biasing means comprises a tongue projecting radially inward from the first side and contacting axial end faces of the plurality of rollers.

8. The roller bearing according to claim 1, including intermediate ring pressing the cage toward the second axial end of the roller bearing.

9. The roller bearing according to claim 8, wherein the intermediate ring directly contacts the first side ring of the cage.

10. A roller bearing having a first axial end and a second axial end, the roller bearing comprising:
    an inner ring having a raceway;
    an outer ring having a raceway;
    a cage between the inner ring and the outer ring, and a plurality of rollers retained by the cage and in contact with the inner ring raceway and the outer ring raceway, wherein the cage has a first side ring between the first axial end of the roller bearing and the plurality of rollers and a second side ring between the second axial end of the roller bearing and the plurality of rollers and a plurality of bridges connecting the first side ring to the second side ring and defining a plurality of pockets in which the plurality of rollers are received, wherein the inner ring includes an inner ring guide flange between the plurality of rollers and the second axial end of the roller bearing or the outer ring includes an outer ring guide flange between the plurality of rollers and the second axial end of the roller bearing, and wherein the roller bearing further includes biasing means in contact with the first side ring for exerting a biasing force against the first side ring to push the first side ring toward the second axial end of the roller bearing.

11. The roller bearing according to claim 10, wherein the biasing means is an intermediate ring attached to the inner ring or the outer ring.

12. The roller bearing according to claim 11, wherein the intermediate ring includes an axially extending section that abuts against the inner ring or the outer ring, and a radially extending section that abuts against the cage.

13. The roller bearing according to claim 11, wherein the roller bearing is a tapered roller bearing, and wherein the rollers are tapered rollers.

14. The roller bearing according to claim 10, wherein the biasing means is configured to exert the axial force against an axially outer surface of the first side ring.

15. A roller bearing having a first axial end and a second axial end, the roller bearing comprising:
 an inner ring;
 an outer ring;
 a cage between the inner ring and the outer ring; and
 a plurality of rollers retained by the cage each of the rollers having a first axial end and a second axial end, wherein the cage has a first side ring between the first axial end of the roller bearing and the plurality of rollers and a second side ring between the second axial end of the roller bearing and the plurality of rollers and a plurality of bridges connecting the first side ring to the second side ring and defining a plurality of pockets in which the plurality of rollers are received, wherein the inner ring or the outer ring includes a retaining flange for guiding the first axial ends of the rollers and a guide flange for guiding the second axial ends of the rollers, and the roller bearing further including biasing means for exerting a force against the first axial ends of the plurality of rollers and pushing the plurality of rollers toward the guide flange, wherein the biasing means is separate from the retaining flange and separate from the guide flange.

16. The roller bearing according to claim 15,
wherein the biasing means extends from a first axial side of the retaining flange to a second axial side of the retaining flange and directly contacts the first axial ends of the plurality of rollers at locations spaced from the retaining flange.

17. The roller bearing according to claim 16,
wherein a portion of the biasing means is located radially between the first side ring of the cage and the outer ring.

18. The roller bearing according to claim 17, wherein the biasing means comprises an intermediate ring with at least one elastic tongue that abuts against at least one of the rollers.

19. The roller bearing according to claim 18, wherein the at least one elastic tongue comprises a plurality of elastic tongues distributed circumferentially around the cage in a uniform manner.

20. The roller bearing according to claim 15,
wherein the biasing means and the plurality of rollers are located on a same side of the second side ring of the cage.

* * * * *